US007381259B2

(12) United States Patent
Hanneman, Jr. et al.

(10) Patent No.: US 7,381,259 B2
(45) Date of Patent: *Jun. 3, 2008

(54) FOUNTAIN SOLUTION CONCENTRATES

(75) Inventors: Raymond J. Hanneman, Jr., Milwaukee, WI (US); Jeffrey G. Behrens, Burlington, WI (US); Salvatore R. Viverito, Palatine, IL (US)

(73) Assignee: RBP Chemical Technology, Inc., Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/456,968

(22) Filed: Jul. 12, 2006

(65) Prior Publication Data

US 2006/0243162 A1 Nov. 2, 2006

Related U.S. Application Data

(63) Continuation of application No. 10/216,514, filed on Aug. 9, 2002, now Pat. No. 7,196,047.

(51) Int. Cl.

| | |
|---|---|
| ***C11D 3/00*** | (2006.01) |
| ***C11D 17/00*** | (2006.01) |
| ***C09J 101/00*** | (2006.01) |
| ***C09J 1/00*** | (2006.01) |

(52) U.S. Cl. .............................. 106/175.1; 106/181.1; 106/190.1; 106/191.1; 106/194.2; 510/422; 510/432; 516/198; 516/200; 516/202; 516/204; 516/906; 516/917; 516/918; 516/920

(58) Field of Classification Search ................ 510/422, 510/432; 516/198, 200, 202, 204, 906, 917, 516/918, 920; 106/175.1, 181.1, 190.1, 191.1, 106/194.2

See application file for complete search history.

(56) References Cited

U.S. PATENT DOCUMENTS

| | | | | | |
|---|---|---|---|---|---|
| 4,030,417 | A | | 6/1977 | Lipovac | |
| 4,231,605 | A | | 11/1980 | Newman | |
| 4,390,035 | A | | 6/1983 | Hill | |
| 4,414,128 | A | | 11/1983 | Goffinet | |
| 4,523,854 | A | | 6/1985 | Beckley | |
| 4,572,229 | A | | 2/1986 | Mueller | |
| 4,604,952 | A | | 8/1986 | Daugherty | |
| 4,664,721 | A | | 5/1987 | Valasek | |
| 4,724,041 | A | * | 2/1988 | Sherman | 216/53 |
| 4,754,779 | A | | 7/1988 | Juhasz | |
| 4,764,213 | A | * | 8/1988 | Gventer et al. | 106/2 |
| 4,854,969 | A | | 8/1989 | Bassemir et al. | |
| 4,865,646 | A | | 9/1989 | Egberg | |
| 4,969,480 | A | | 11/1990 | Hughes | |
| 5,006,168 | A | | 4/1991 | Modi et al. | |
| 5,054,394 | A | * | 10/1991 | Zweig | 101/451 |
| 5,064,749 | A | | 11/1991 | Matsumoto et al. | |
| 5,221,330 | A | * | 6/1993 | Matsumoto et al. | 106/2 |
| 5,268,025 | A | | 12/1993 | Bondurant | |
| 5,279,648 | A | | 1/1994 | Chase | |
| 5,279,658 | A | | 1/1994 | Aung | |
| 5,308,388 | A | | 5/1994 | Schell | |
| 5,336,302 | A | | 8/1994 | Bondurant | |
| 5,382,298 | A | | 1/1995 | Bondurant | |
| 5,387,279 | A | | 2/1995 | Conti et al. | |
| 5,433,240 | A | | 7/1995 | Mueller | |
| 5,585,341 | A | | 12/1996 | Van Eenam | |
| 5,592,880 | A | | 1/1997 | Rodi | |
| 5,619,920 | A | | 4/1997 | MacPhee | |
| 5,637,444 | A | | 6/1997 | Matsumoto | |
| 5,667,768 | A | | 9/1997 | Ramin | |
| 5,694,846 | A | | 12/1997 | MacPhee | |
| 5,695,550 | A | | 12/1997 | Marx et al. | |
| 5,713,282 | A | | 2/1998 | MacPhee | |
| 5,720,800 | A | | 2/1998 | Matsumoto | |
| 5,826,507 | A | | 10/1998 | Lim | |
| 5,897,693 | A | | 4/1999 | Whitehead | |
| 6,187,081 | B1 | | 2/2001 | Sures et al. | |
| 6,239,094 | B1 | | 5/2001 | Goderis et al. | |
| 6,294,318 | B1 | | 9/2001 | Matsumoto et al. | |
| 6,593,068 | B1 | | 7/2003 | Watanabe | |
| 2001/0036538 | A1 | * | 11/2001 | Rozynov et al. | 428/195 |
| 2002/0187427 | A1 | * | 12/2002 | Fiebag | 430/292 |

FOREIGN PATENT DOCUMENTS

| | | |
|---|---|---|
| EP | 1080943 | 3/2001 |
| JP | 6-344533 A | 12/1994 |

OTHER PUBLICATIONS

Hydro-Blend® Operating Manual, Crown Technology Corporation, Boise, ID (2001).
Rust Sales, Inc., Online Catalog (Harwood, ND) http://www.rustsales.com/acatalog/Online_Catalogue_Dosatron_Direct_Injection_Liquid_Handling_Product. . . , p. 1 (printed Jul. 11, 2002).
Rust Sales, Inc., Online Catalog (Harwood, ND) http://rustsales.com/acatalog/index/html, pp. 1 and 2 (printed Jul. 11, 2002).
Dosatron International Home Page (Dosatron International (France) (2002) http://www.dosatron.com, p. 1 (printed Jul. 11, 2002).
Dosatron USA/Dosatron International: The World Leader in Proportional Liquid Dispens . . . , Dosatron Intl, Clearwater, FL USA (1999-2000) http://www.dosatronusa.com/productline.asp, pp. 1-2 (printed Jul. 11, 2002).
rbp Chemical Technology, Product Data Sheet, Dosatron Injection Pumps, 1 page, rbp Chemical Technology, Milwaukee, WI (1998).
RBP Graphex Application/Product Tips http://www.chemelex.com/app_g.html, pp. 1-11 (printed Apr. 30, 2002).

(Continued)

*Primary Examiner*—Elizabeth D Wood
(74) *Attorney, Agent, or Firm*—Whyte Hirschboeck Dudek SC

(57) ABSTRACT

Liquid concentrate components of a fountain solution are provided, including a liquid film-forming fountain solution concentrate and a liquid surface-tension reducing fountain solution concentrate. The concentrates and water can be combined together to form a fountain solution composition.

24 Claims, 4 Drawing Sheets

OTHER PUBLICATIONS

RBP Chemelex—main page, CHEMELEX® http://www.chemelex:com/main_c.html, p. 1 (printed Apr. 30, 2002).
RBP Graphex Products Profiles, Product Data Sheets http://www.chemelex.com/g_prod.html, pp. 1-4 (printed Apr. 30, 2002).
rbp Chemical Technology, Product Data Sheets: Unitrol® 120 fountain concentrate (1997), Unitrol® 123 (2000), Unitrol® 125 (1999), Unitrol® 192 (1999), Aqua Series 100 fountain concentrate (1995), Aqua Series 960 N (1998), Aquanol® 300 alcohol replacer (2000), Aquanol® 600 (2000), Aquanol® 800 (2000), Aquanol® Zero (2000), Plate Desensitizer fountain additive (1998), Plastic Plate Desensitizer (2002), Antifoam (1998), Growth-Inhibitor (2002), Non-Piling Agent (1998).
rbp Chemical Technology, Product Data Sheet: Universal Duplicator Fountain Concentrate (1998).
rbp Chemical Technology, Product Data Sheets: Aqua Series 150 fountain concentrate (2002), Aqua Series 180 (1998), Aqua Series 900 N (2001), Aqua Series 910 (2002), Aqua Series 910 N (1998), Aqua Series 915 (2002).
rbp Chemical Technology, Product Data Sheets: Unitrol® 924 fountain concentrate (2002), Unitrol® 924 Plus (2002), Unitrol® 946 (1999), Unitrol® 987 (2000), Unitrol® 1000 (1998), Unitrol® 9000 (2002), Unitrol® 9100 (2001), Unitrol® CTP (1999), Unitrol CTP 1 (2001), Unitrol® CTP II (2001).
RBP Graphex Product News, News, News, News http://www.chemelex.com/news_g.html, pp. 1-3 (printed Apr. 30, 2002).
RBP Graphex—Web Fountain Solutions, Application/Product Tips http://www.chemelex.com/app_g1.thml, pp. 1-2 (printed Apr. 30, 2002).

* cited by examiner

FOUNTAIN SOLUTION CONCENTRATES

CROSS-REFERENCE TO RELATED APPLICATION

The present application is a continuation of pending U.S. application Ser. No. 10/216,514, filed Aug. 9, 2002, now U.S. Pat. No. 7,196,047.

FIELD OF THE INVENTION

This invention relates generally to fountain solutions, and more particularly to methods of preparing and delivering fountain solutions for use on lithographic printing presses.

BACKGROUND OF THE INVENTION

Lithographic offset printing utilizes printing plates having a non-image area and an image area. With proper treatment, the image areas are hydrophobic and receptive to inks, and the non-image areas are hydrophilic and water receptive. During the printing process, it is necessary to continuously treat the plate with a water-based fountain solution (dampening solution) in order to maintain the hydrophilic character on the non-image areas.

While an offset printing press is running, fountain solution is continuously applied to the printing plate just before the application of the printing ink. The fountain solution is formulated to have an affinity for the non-image, hydrophilic areas of the plate and wets these areas. The thin film of fountain solution prevents the subsequent application of ink from covering the plate in a non-image area.

Fountain solution compositions vary widely to meet an assortment of applications. Different plate materials such as paper, polyester, and anodized aluminum require different chemistries. The type of printing, ink, paper, water and dampening system also plays a role in the type of fountain solution to be used.

A fountain solution or press ready mix is generally made from a fountain solution concentrate and water for most web applications, plus alcohol or an alcohol substitute for sheet fed and certain web applications. A fountain solution concentrate typically includes about 50-80% by wt water and selected components including film-formers such as gums, synthetic polymers, complex sugars, surfactants, solvents, acids and buffering agents to maintain the pH, desensitizing agents, biocides, non-piling agents, and chelating agents for hard water salts, for example. The surfactants and alcohol or alcohol substitutes act to promote plate wetting by lowering the surface tension of water to make the fountain solution spread more efficiently across the plate surface. The combination of components provide an environment that keeps the plate printing clean while maintaining good ink and water balance. Typically, a standard fountain concentrate is diluted with water to an about 1-5% by volume concentration in a day tank or recirculating system, more commonly to an about 3-5% by volume concentration.

Depicted in FIG. 1, is an exemplary conventional prior art system 10 for preparing fountain solutions that includes a mixing apparatus 12. In conventional systems, a pre-mixed fountain solution concentrate 14 and a water source 16 are flowed through inlets 18*a*, 18*b* into a mixer 12, and the reconstituted fountain solution 20 is flowed out of the mixer through a product outlet 22 to a supply tank (day tank) 24. The fountain solution 20 is conveyed through conduit 25 to a recirculating tank 26 where it is chilled to about 45-60° F., and then conveyed through conduit 27*a* to a press unit 28 for application to a printing plate (not shown). The used fountain solution 20 is then returned through conduit 27*b* to the recirculating tank 26 for re-cooling.

Thus, with conventional systems, a single concentrate containing the chemical components of a fountain solution is prepared ex situ and then diluted with water to provide a press-ready composition. In cases where an increase in desensitizer is required for a given plate type, the concentration of the fountain solution concentrate is increased, which also increases the concentration of wetting agents and other components of the fountain solution. In certain situations, the increased concentration of such other components can disturb the ink and water balance and reduce the quality of the printed image. It would be desirable to provide a system and a process that eliminates such disadvantages. It would also be desirable to provide a system that eliminates water from the fountain solution concentrate to conserve on space, usage rates and shipping costs.

SUMMARY OF THE INVENTION

The present invention provides fluid concentrates comprising the component parts of a fountain solution, and methods and systems for preparing fountain solution compositions for offset printing.

A conventional fountain solution concentrate comprises both a film-forming component and wetting components in a single concentrate solution that typically comprises about 50-80% water that is derived from both the chemical constituents themselves and an added water component. The present invention provides super concentrated fountain solutions that comprise component parts of a press ready fountain solution. Preferably, the concentrates comprise a minimal amount of water, being derived from the raw ingredient components and not as a separately added ingredient. The component concentrate solutions can be combined together and with water to form a press-ready fountain solution. Advantageously, the present concentrate solutions provide savings on shipping costs, reduce container size requirements and eliminate other space constraints of conventional fountain solution concentrates, reduce the dosage amounts needed to formulate a press-ready fountain solution, and permit more accurate blending of component parts to provide a customized and precise formulation for the needs of a consumer in a particular application.

In one aspect, the invention provides liquid concentrate solutions as component parts of a fountain solution. In one embodiment, the concentrate solution comprises a water-soluble film-forming polymer, acids, and buffering agent. Preferably, the concentrate comprises a mixture of organic acids, and includes inorganic acids. In an exemplary embodiment, the acidic, film-forming polymer concentrate comprises about 10-60% by wt of water-soluble film-forming polymer, about 5-50% by wt of organic acid, about 5-50% by wt of inorganic acid, about 5-30% by wt of buffering agent and, optionally, about 1-50% by wt of water-soluble glycol solvent. Exemplary water-soluble film-forming polymers include gums, starch derivatives, complex sugars, alginate, and cellulose derivatives. Exemplary water-soluble glycol solvents include glycerine, $C_2$ to $C_6$ glycols, and polyglycols. The concentrate can optionally include a biocide, dye, desensitizing agent, and/or chelating agent.

In another embodiment, the concentrate comprises surface tension reducing or wetting components of a fountain solution composition, such as glycols and/or glycol ethers, and surfactants. In an exemplary embodiment, the surface tension reducing concentrate comprises up to about 90% by wt of glycol and/or water-soluble glycol ether, about 1-50% by wt of nonionic surfactant, and about 1-25% by wt of partially water-soluble glycol ether, ester, glycol and/or alcohol. Preferably, a nonionic surfactant such as alkyl pyrollidones or alkyne derivatives is included. The concentrate can optionally include a biocide, dye, defoaming agent, and/or conductivity (dosage) marker.

In another aspect, the invention provides a method of preparing a lithographic fountain solution. In one embodiment, the method comprises proportioning at least two liquid concentrates according to the invention comprising components of the fountain solution into a water source within a mixing apparatus to form the fountain solution. An exemplary mixing apparatus comprises dual- or multi-action proportioning pump to facilitate metering two or more liquid concentrate solutions as component parts of a fountain solution into a mixing chamber within the pump, and a water source to combine with the concentrate solutions within the mixing chamber. In an embodiment of the method, first and second liquid concentrate are proportioned into a water source; the first liquid concentrate comprising a water-soluble film-forming polymer and one or more organic acids; and the second liquid concentrate comprising a diluent, a solvent, and a surfactant.

The proportioning pump can comprise, for example, an inlet for the first concentrate, an inlet for the second concentrate, an inlet for the water source, an outlet for dispensing the fountain solution, and a motor piston connected to first and second metering pistons; such that movement of the motor piston meters water into the apparatus and causes movement of the first and second metering pistons to meter a proportion of first and second concentrates into the water within the pump.

The method can further comprise the steps of monitoring the pH, conductivity, and/or the surface tension of the fountain solution; and adjusting the proportion of the liquid concentrates that are metered into the mixing chamber to alter the pH, conductivity, and/or the surface tension of the fountain solution.

In another aspect, the invention provides a system for preparing a fountain solution. In one embodiment, the system includes sources of liquid concentrates that are component parts of a fountain solution; a source of water; and an apparatus operable for metering a proportion of a stream of each of the liquid concentrates into a stream of the water to form the fountain solution, for example, a multi-action proportioning pump. Exemplary liquid concentrates include a first liquid concentrate comprising an organic acid and water-soluble film-forming polymer; and a second liquid concentrate comprising wetting components of the fountain solution. The system can further include a containing system for receiving and holding the discharged fountain solution, such as a recirculating tank; one or more measuring/monitoring devices such as a pH probe, a conductivity probe, and a surface tension probe. The system can also include a device for controlling the amount of the liquid concentrates metered into the stream of the water, which can be connected to a measuring device (e.g., pH probe) and operably responsive to the output measurement of the pH, the conductivity or the surface tension of the fountain solution to adjust the amount of the concentrates metered into the stream of the water when a value of the output measurement deviates from a predetermined value.

The system advantageously mixes and supplies precise and consistent amounts of fluid concentrates that are component parts of a fountain solution to a mixing zone, and can readily modify the fountain solution according to the formulation required in an particular application.

In yet another aspect, the invention provides an article of manufacture or kit for preparing a fountain solution. In one embodiment, the article of manufacture comprises first and second liquid concentrates packaged together; the first liquid concentrate comprising one or more water-soluble film-forming polymers and organic acids, and up to about 30% by wt water; and the second liquid concentrate comprising one or more diluents, solvents, and surfactants, and up to about 10% by wt water. The article of manufacture can further comprise an apparatus operable for metering a proportion of each of the first and second liquid concentrates into water to form the fountain solution. In one embodiment, the metering apparatus comprises a multi-action proportioning pump. The kit can further include one or more devices for measuring parameters of the fountain solution such as pH, conductivity, surface tension, among others.

BRIEF DESCRIPTION OF THE DRAWINGS

Preferred embodiments of the invention are described below with reference to the following accompanying drawings, which are for illustrative purposes only.

DETAILED DESCRIPTION OF THE PREFERRED EMBODIMENT

The invention will be described generally with reference to the drawings for the purpose of illustrating embodiments only and not for purposes of limiting the same. Unless otherwise indicated, all percentages or parts are by weight.

The method and system of the invention provides for the accurate proportioning and mixing of two or more fluid concentrates that constitute component parts of a fountain solution with a water source to form a press-ready fountain solution composition.

Figure 1:
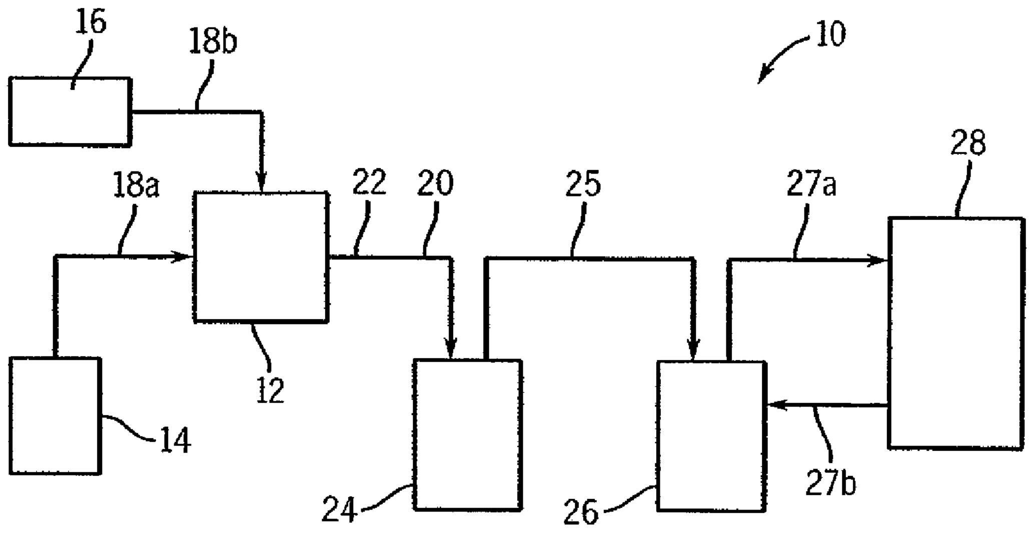
FIG. 1 (Prior Art)
FIG. 1 is a diagrammatic depiction of a prior art system in which a pre-mixed fountain solution composition is flowed through an inlet into a mixer to combine with a water source, and then conveyed to a recirculating tank and to a press unit.
Figure 2:
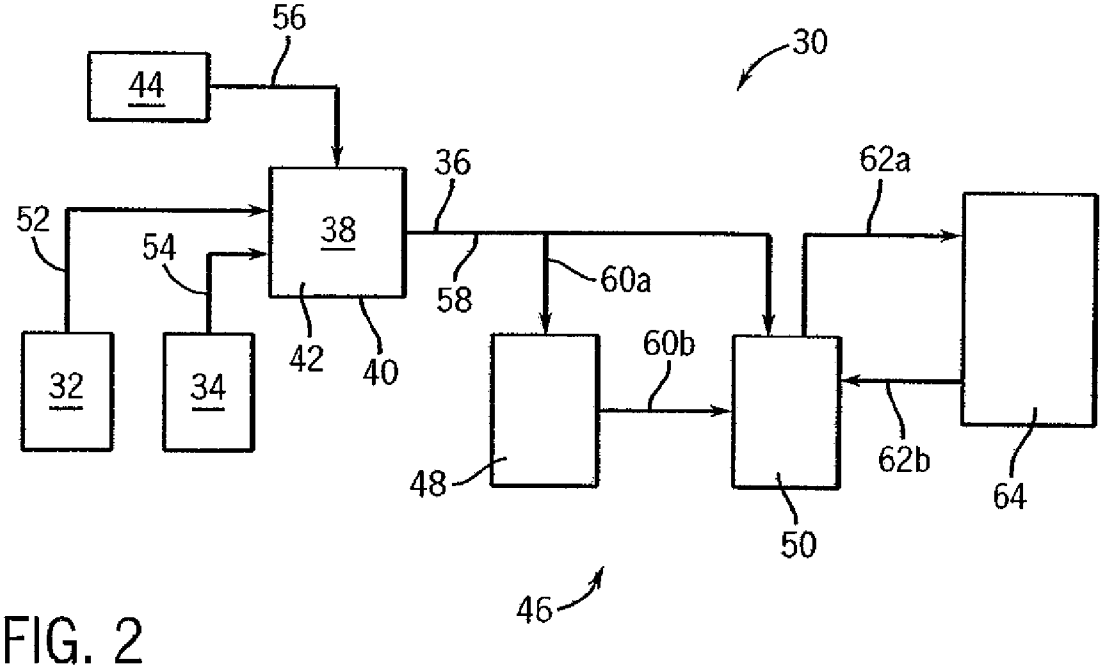
FIG. 2 is a diagrammatic depiction of an embodiment of a system according to the invention in which separate concentrates that constitute the component parts of a fountain solution are flowed into a mixing apparatus such as proportioning pump, and combined with a water source to form a fountain solution composition.

One embodiment of a system 30 for preparing a fountain solution composition according to the invention is schematically depicted in FIG. 2. In the illustrated example, two concentrate compositions 32, 34 as component parts of a fountain solution are combined, which is merely exemplary. The system 30 comprises a source of each of the concentrate compositions 32, 34, a pump or other mixing apparatus 38 having a housing 40 and a mixing chamber 42 for receiving and blending the concentrate compositions 32, 34 with a source of water 44 to form the press-ready fountain solution composition 36, and a holding system 46 for containing the fountain solution composition 36. In the illustrated embodiment, the holding system 46 comprises a supply tank 48 and a recirculating tank 50. Inlet conduits or supply tubes 52, 54 convey the concentrate compositions 32, 34, and inlet conduit 56 conveys the water source 44 into the mixing chamber 42 of the mixing apparatus 38. Product outlet or exit line 58 conveys the fountain solution composition 36 directly to the recirculating tank 50, or through conduit 60_a_ to the supply tank 48 and onto tank 50 through conduit 60_b_. Conduits 62_a_, 62_b_ convey the fountain solution composition 64 from the recirculating tank 50 to and from a press unit 62, respectively. The fountain solution composition can be delivered to a printing plate by any number of known methods including, for example, roller, spray or brush systems.

Any number of conventional mixers can be used for mixing the concentrate component parts and water source to form the press-ready fountain solution composition. Particularly well-suited for preparing the fountain solution composition is a proportioning pump (proportioner) that controls the proportions of two or more fluid components to a desired formulation and intermixes the components in precisely controlled ratios with water to make a defined blend. The proportioning apparatus can be operable to provide continuous mixing of component parts (i.e., concentrates) of the fountain solution with water by delivering a continuous flow and substantially consistent proportion of the individual concentrate compositions and the water source into a mixing zone of the apparatus.

Automatic, self-powered proportioners are conventional in the art and described, for example, in U.S. Pat. Nos. 5,433,240 and 4,572,229, issued to Thomas D. Mueller, the disclosures of which are incorporated herein by reference. As described, the pressure of the water stream is used to power the proportioning pump. In brief, pressurized water from a water source is directed into the pump through an inlet. This causes alternating (reciprocal) movement of a motor piston within a cylinder, automatically metering an amount of water with each stroke by filling the cylinder with water and then expelling the water from the cylinder to an exit stream. The motor piston is connected to and powers a fluid pump for metering a fluid concentrate into the exit stream to mix with the water. As the motor piston moves, the fluid piston is withdrawn from a fluid pump chamber, which draws an amount of fluid concentrate through an intake into the fluid pump chamber. As the motor piston returns, the fluid piston is pushed back into the fluid pump chamber and the fluid concentrate is expelled through a line injection tube into the exit stream to mix with the exiting water, and then passes through a discharge conduit or exit line. A constant proportion of the water and the concentrates are mixed in each cycle. An example of a commercially available proportioning pump is the Hydro-Blend® pump available through Crown Technology Corporation, Lake Forest, Ill.

According to the invention, a proportioner can be structured as a modification of the foregoing pump assemblies to operate as a multi-action pump to feed multiple concentrates (component parts) into a mixing zone within the pump to form the fountain solution composition. A dual-action proportioner can be structured with first and second fluid pumps, each connected to the motor piston such that the first and second fluid concentrates can be simultaneously drawn up by respective fluid pumps and metered into the proportioner to blend with the water flow in an exit stream.

An example of a proportioning pump (proportioner) according to the invention is illustrated in FIGS. 3-8. As depicted, the proportioner 38 comprises dual fluid concentrate pumphead assemblies (pumps) 66_a_, 66_b_ for metering the individual concentrate compositions 32, 34 into a mixing chamber 42; adjustment mechanisms 68_a_, 68_b_ for regulating the proportion of each of the concentrate compositions 32, 34, respectively, metered into the mixing chamber 42 by the fluid pumps 66_a_, 66_b_; a water inlet or supply line 56 for conveying a water source 44 into the mixing chamber 42; and an outlet or exit line 58 for conveying the aqueous fountain solution composition 36 from the mixing chamber 42 to a container such as a supply tank/day tank or a recirculating tank, or to use points in the process flow.

Preferably, the proportioning pump 38 comprises an about 18×18 stainless steel enclosure, 3 oz/1.5 oz. dual injunction pumps 66_a_, 66_b_ with high density polyethylene (HDPE) pump heads, the 3 oz. pump head having Viton® seals and the 1.5 oz. pump head having Teflon® seals. The pump 38 can further contain a water filter and static mixer. Features and operation of the proportioning pump 38 are similar to the variable proportioner as described in U.S. Pat. Nos. 5,433,240 and 4,572,229, with the modification of dual pump head assemblies as illustrated and described.

In use, an appropriate mixing ratio of the concentrate compositions (e.g., 32, 34) can be conveyed into the mixing chamber of the proportioner utilizing adjustment mechanisms 68_a_, 68_b_ to meter the fluid concentrates 32, 34 at a selected rate into a water stream within the proportioner, and to vary the ratios of the two fluid concentrates. In the illustrated example in FIGS. 3-8, the adjustment mechanisms 68_a_, 68_b_ comprise a threaded rod 70_a_, 70_b_, an indicia scale 72_a_, 72_b_, and a locking screw 74_a_, 74_b_. The adjustment mechanisms 68_a_, 68_b_ are operably connected to fluid pistons or plungers 76_a_, 76_b_, respectively, of the fluid pumps 66_a_, 66_b_, which are connected to the motor piston 78. The adjustment mechanisms 68_a_, 68_b_ can be adjusted to alter the proportion of each of the concentrate compositions 32, 34 that is metered through line injection conduits 70_a_, 70_b_ into the mixing chamber 42 of the proportioner 38 to give a defined blend of the concentrates and the water. The proportioner 38 can be controlled manually, by screw adjustment of the pistons, or electronically through a motor system to adjust the pistons.

Figure 3:
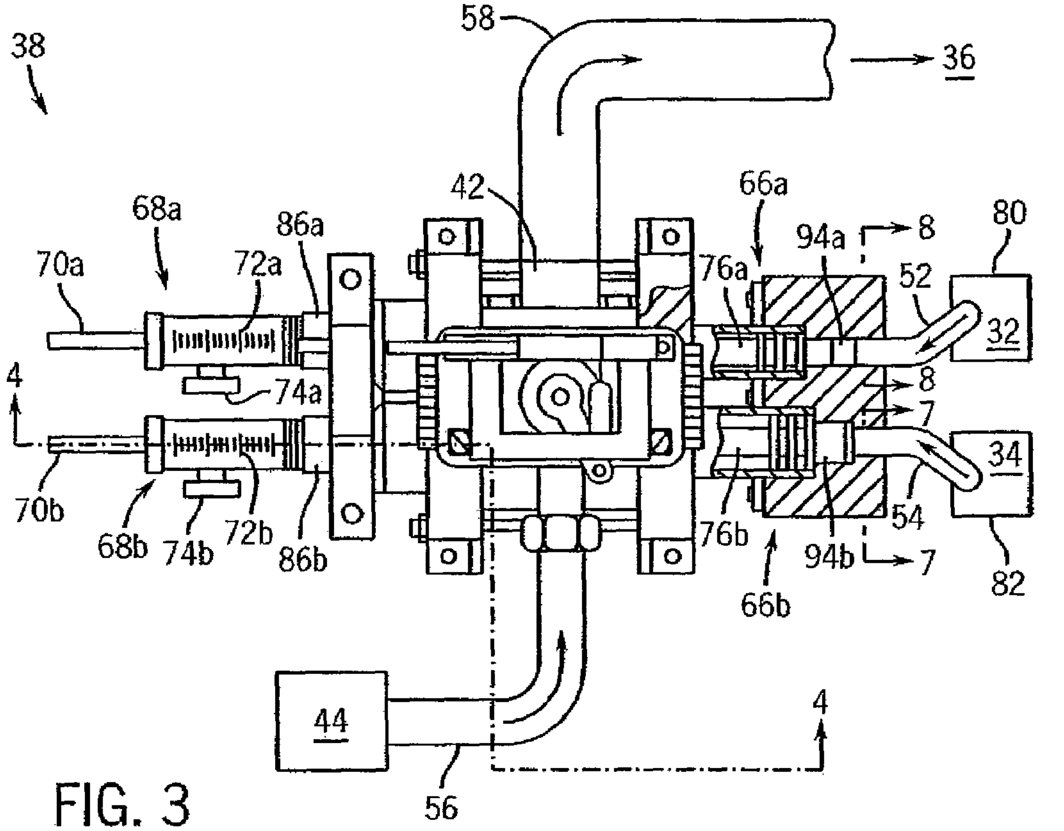
FIG. 3 is a top plan view and partial sectional view of an embodiment of a proportioning pump apparatus for use in the system of the invention depicted in FIG. 2.
Figure 4:
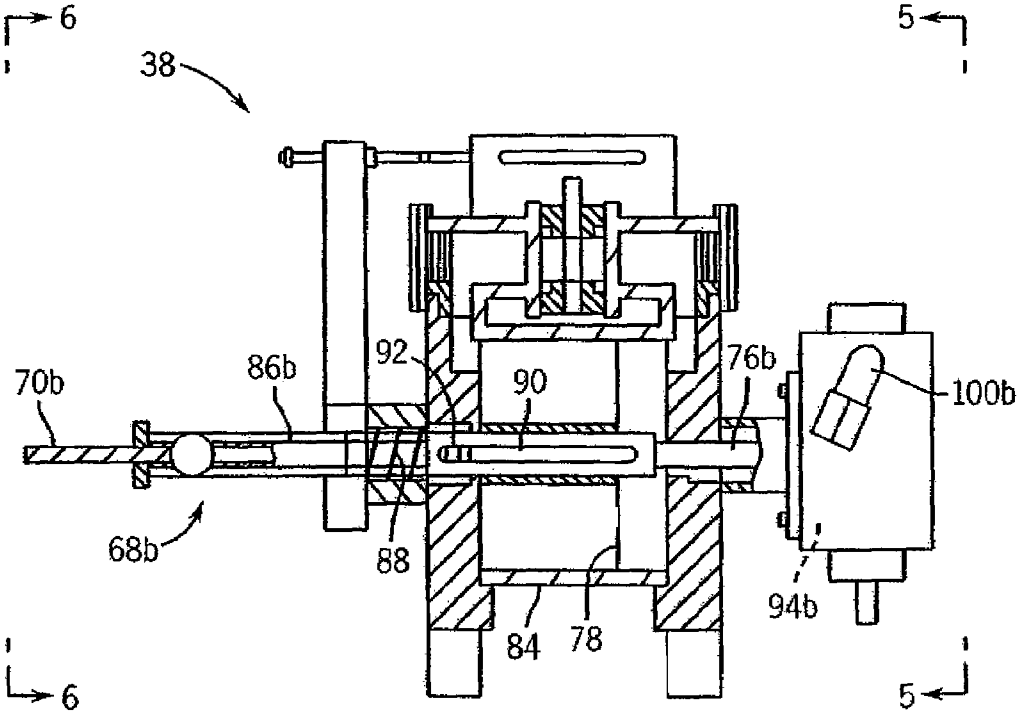
FIG. 4 is a partial side sectional view of the proportioning pump of FIG. 3, taken along lines 4-4.
Figure 5:
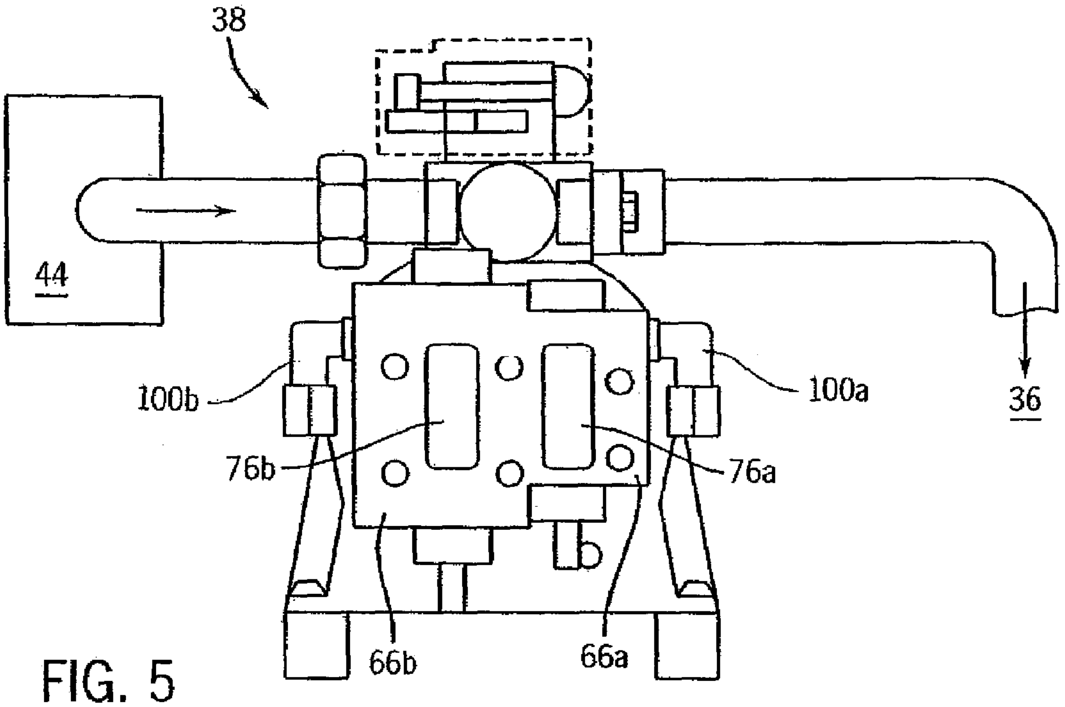
FIG. 5 is an end elevational view of the proportioning pump of FIG. 4, taken generally along lines 5-5.
Figure 6:
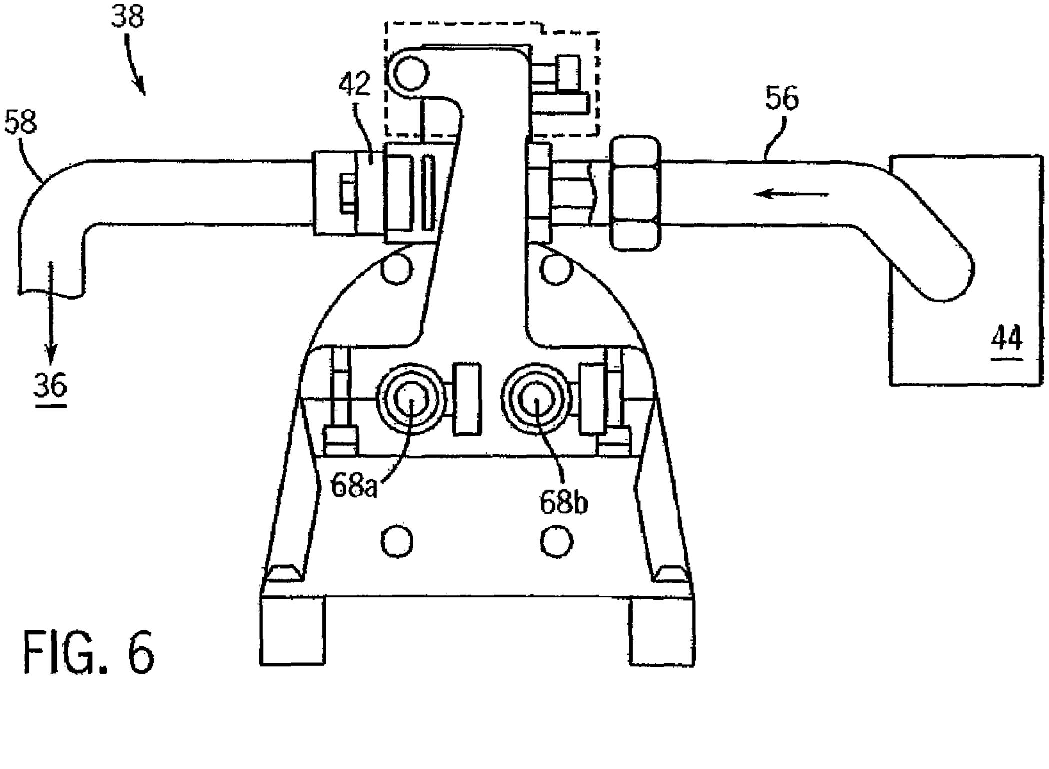
FIG. 6 is an end elevational view of the proportioning pump of FIG. 4, taken generally along lines 6-6.
Figure 7:
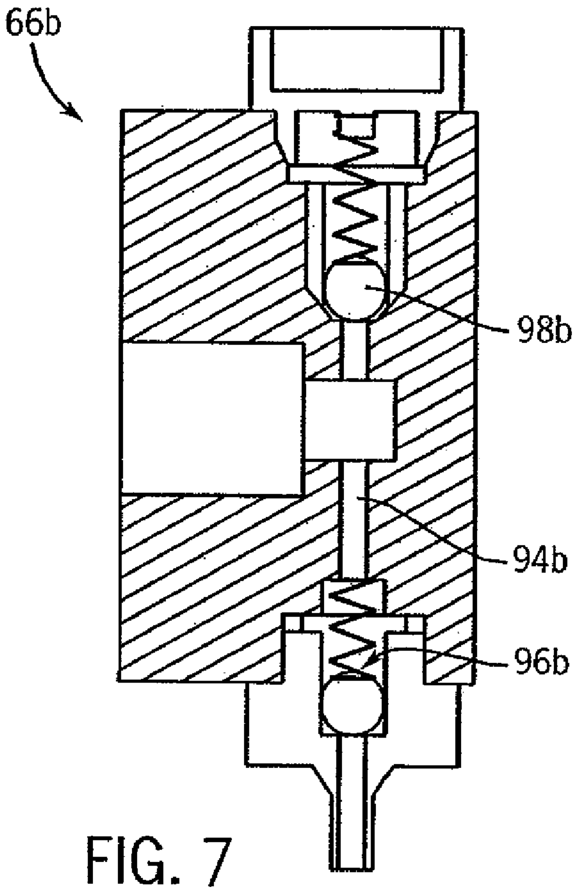
FIG. 7 is a side sectional view of the proportioning pump of FIG. 4, taken along lines 7-7.
Figure 8:
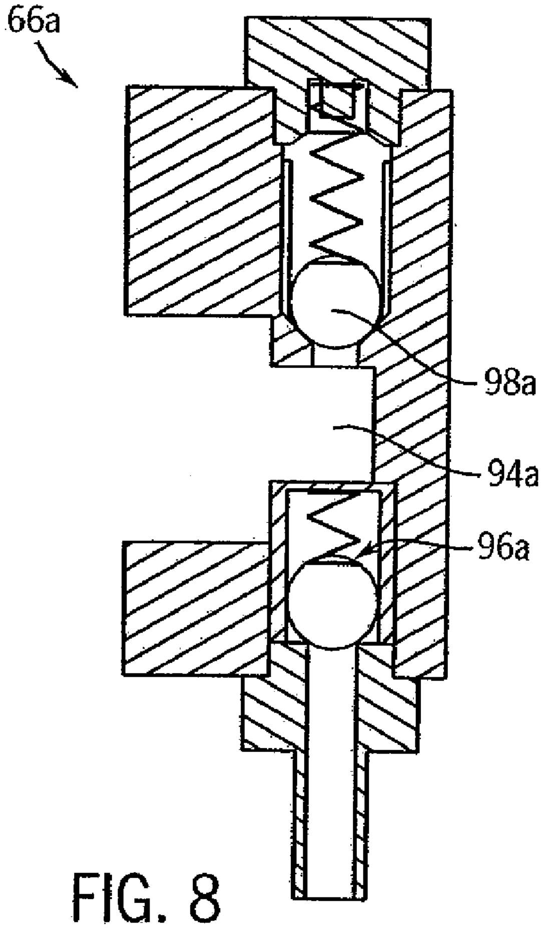
FIG. 8 is a side sectional view of the proportioning pump of FIG. 4, taken along lines 8-8.

In operation, the intake conduits 52, 54 are connected to the respective concentrate container 80, 82. Pressurized water from a water source 44 is directed into the device through inlet 56, which causes alternating movement of the motor piston 78. As the motor piston 78 moves within the cylinder 84, it carries rods 86_a_, 86_b_ and, through the springs 88, slot 90 and pins 92 arrangement, also fluid pistons 76_a_, 76_b_. As the fluid pistons 76_a_, 76_b_ are withdrawn from the pump chambers 94_a_, 94_b_, the concentrates 32, 34 are drawn up through open valves 96_a_, 96_b_ into the pump chambers 94_a_, 94_b_, as best illustrated in FIGS. 7-8. Upon return movement of the motor piston 78, the fluid pistons 76_a_, 76_b_ return all the way into the pump chambers 94_a_, 94_b_ until the piston face engages the wall of the pump chamber. This causes the concentrates 32, 34 to pass through the check valves 98_a_, 98_b_ and out through discharge conduits 100_a_, 100_b_ to mix with exiting water in the mixing chamber 42 to form the press-ready fountain solution, as best seen in FIGS. 3 and 6, before entering the discharge conduit 58.

Advantageously, the present proportioning pump provides highly accurate blending of the component concentrates at very low dosages of about 0.1 to about 1 ounce/gallon compared to conventional pumps such as Dosatron® direct inject metering pump by Dosatron International (Clearwater, Fla.), among others, provide component blending at much higher amounts of about 2-7 ounces/gallon and without the desired high accuracy and precision of the present process.

Fountain Solution Composition

According to the method of the invention, the fountain solution composition is prepared by blending together two or more liquid concentrate compositions with water to a desired concentration. The concentrate compositions comprise component parts of a fountain solution formulation. The component concentrate compositions comprise the chemical ingredients of the fountain solution in effective amounts such that when the concentrate compositions are blended together and with water, the specified requirements of the fountain solution are met as required for a particular application including, for example, the type of printing process and paper being utilized. The concentrate compositions preferably omit water as an added component to achieve super-concentrated compositions resulting in a reduction of shipping costs, of space requirements such as container size and packaging, for example, due to the concentrated nature of the component compositions, and of usage levels to produce the press-ready fountain solution.

A fountain solution composition made according to the invention generally comprises water, a water-soluble film-forming polymer, an acid component, a pH buffering agent, solvents, wetting agents, non-ionic surfactant, and optional ingredients such as biocide, desensitizers, dye, chelating agent, defoaming agent, and conductivity marker, among others. The ingredients are blended to meet specific requirements in a lithographic printing process, for example, for cleaning and desensitizing the surface of a lithographic printing plate, to replenish the desensitized area of the printing plate, and to continuously maintain the non-printing area as water-receptive or hydrophilic.

One exemplary embodiment of preparing a fountain solution composition according to the invention comprises blending a first liquid concentrate composition comprising a buffered, acidic film-forming concentrate with a second liquid concentrate comprising wetting or surface tension reducing components, and with water.

In a preferred embodiment, the fountain solution composition is prepared using a dual action proportioning pump as described with regard to FIGS. 3-8. With a dual pump system, the increase in the amount of film-forming polymer is controlled through one of the concentrate solutions, being the first liquid concentrate in the illustrated example. By adjusting the flow rate scale of the first liquid concentrate, the amount of film-forming polymer can be increased without disrupting the dynamic surface tension of the fountain solution, thus reducing the impact on the ink and water balance on press. A dual pump system according to the invention allows for ready variation in the fountain solution mix to maximize the water and ink balance and plate performance.

A conventional fountain solution concentrate typically comprises about 50-80% by wt water and requires a dilution to about 1-5% by volume to provide a press-ready solution. The pH of the solution typically ranges from about 2 to 6 with a conductivity range between 100 and 1000 micromhos/cm per each ounce/gallon. The use of a dual pump system to prepare fountain solutions according to the invention facilitates delivery of the component concentrates, e.g., an acidic film-forming concentrate and a surface tension reducing concentrate, at about 0.1% to about 2% by volume (more typically at about 0.2% to about 1% by volume) with a pH of about 2-6, and a final conductivity range of about 1000 to 4000 micromhos/cm. The advantage of the dual pump system is that the amount of particular chemical components delivered to the dampening system can be varied based on the type of dampening system in use and the type ink and paper required to print the required image.

The liquid concentrate solutions can be packaged together as part of an article of manufacture or kit, that includes the compositions separately packaged in a container such as capped tubes, cartons, plastic pails and drums, fiber containers, and the like, together with instructions for the use of the concentrates for preparing a press ready fountain solution, an apparatus structured to deliver proportions of each of the first and second liquid concentrates into water to form the fountain solution. A preferred metering apparatus is a multi-action proportioning pump, as described herein. Preferably, the apparatus is operable to meter about 0.1-2% by volume of the concentrates into water. The kit can further include one or more probes and/or monitoring devices to measure pH, conductivity, surface tension, and/or other parameter, as known and used in the art.

Acidic Film-Formin Concentrate. In an illustrative example of fountain solution concentrates according to the invention, an acidic film-forming concentrate can be formulated to comprise one or more water-soluble film forming polymers, organic acids, inorganic acids and/or salts thereof, buffering agents, and optionally, water-soluble glycol solvents, chelating agents, desensitizing agents, dyes and/or biocides. An exemplary acidic film-forming concentrate composition comprises about 10-60% by weight (wt), preferably about 20-40% by wt of water-soluble film-forming polymer(s); about 5-50% by wt, preferably about 20-30% by wt of organic acid(s); about 5-50% by wt, preferably about 10-20% by wt of inorganic acid(s) or salt(s) thereof; about 5-30% by wt, preferably about 10-20% by wt of buffering agent(s); and optionally, about 1-50% by wt, preferably about 10-20% by wt of water-soluble glycol solvent(s); about 1-5% by wt, preferably about 1-2% by wt of biocide(s); about 5-30% by wt, preferably about 10-20% by wt of desensitizing agent(s); about 0.1-10% by wt of chelating agent(s); and about 0-1% by wt, preferably about 0.0001-0.001% by wt of dye(s).

The water-soluble film-forming polymer functions to form a film over the plate surface to desensitize the non-image areas and render those areas hydrophilic, and to protect the background or non-image areas from oxidation, fingerprints, dirt and general sensitivity. Exemplary water soluble film-forming polymers useful in the present fountain solution compositions, include natural and synthetic gums and other polymers, such as gum arabic, starch derivatives (e.g., dextrin, enzyme-decomposed dextrin, hydroxypropylated enzyme-decomposed dextrin, carboxymethylated starch, phosphoric acid starch, octenyl succinated starch), complex sugars (e.g., polysaccharides), polyvinyl alcohol, vinyl co-polymers, alginate, and cellulose derivatives (e.g., carboxymethyl cellulose, carboxyethyl cellulose, methyl cellulose, hydroxyethylcellulose, hydroxypropylcellulose, hydroxybutylmethylcellulose). A preferred film-forming agent is sodium carboxymethyl cellulose of the type available under the trade name Ambergum™ by Aqualon Chemical Company (Wilmington, Del.), particularly Amberg™ 3021 and 1221.

The acid component comprises water-soluble organic acids, and can include inorganic acids and/or salts thereof.

Preferably, the acid component comprises a combination of organic acids. Exemplary organic acids include citric acid, gluconic acid, glycolic acid, sulfamic acid, tartaric acid, ascorbic acid, malic acid, maleic acid, lactic acid, acetic acid, malonic acid, levulinic acid, sulfanilic acid, p-toluenesulfonic acid, phytic acid, and organic phosphonic acid. Exemplary inorganic acids and salts of the acids that can be utilized include nitric acid, phosphoric acid, and sulfuric acid, and/or salts thereof such as magnesium nitrate, ammonium phosphates, phosphonates, and the like.

If the pH becomes too acidic, the fountain solution composition can dissolve the non-image areas (e.g., aluminum oxide) of the plate. If the pH is towards the neutral or alkaline side, the film forming agent such as gum arabic can cease working properly. A pH buffering agent is included in the acidic film-forming concentrate composition to adjust and maintain the pH at a desired range of about pH 2-6, preferably about pH 3.5 to 5.5. Examples of useful buffering agents include alkalis or caustics such as ammonium hydroxide, and alkali metals such as sodium hydroxide, sodium carbonate, potassium hydroxide, potassium carbonate, among others; and organic amines such as monoethanolamine, ethylenediamine, and triethanolamine, among others.

Water-soluble glycol solvents can be included to maintain a hydrophilic environment. Examples of suitable glycol solvents include glycerine, and glycols such as ethylene glycol, polyethylene glycol, diethylene glycol, triethylene glycol, propylene glycol, dipropylene glycol, tripropylene glycol, and hexylene glycol, among others.

Biocides can be included in a sufficient amount to inhibit growth of bacteria, fungus and yeast in the concentrate composition and ultimately in the fountain solution. Examples of suitable biocides include sodium benzoate, and quaternary ammonium salts such as quaternary ammonium chloride and dodecyltrimethylammonium chloride. Other useful biocides include, for example, phenol or derivatives thereof, formalin, imidazole derivatives, sodium dehydroacetate, 4-isothiazolin-3-one derivatives, benzotriazole derivatives, derivatives of amidine and guanidine, derivatives of pyridine, quinoline and guanidine, derivatives of diazine and triazole, derivatives of oxazole and oxazine, bromonitropropanol, 1,1-dibromo-1-nitro-2-ethanol, and 3-bromo-3-nitropentane-2,4-diol.

A chemically compatible dye as known and used in the art can also be optionally included.

A sequesterant or chelating compound can also be included to counteract the effects of calcium ions in the water source, which can adversely affect printing and cause scumming to occur. Examples of useful chelating compounds include ethylenediaminetetraacetic acid, diethylenetriaminepentaacetic acid, triethylenetetraminehexaacetic acid, and potassium and sodium salts thereof, among others.

A desensitizing agent can be optionally included. Examples of suitable desensitizing agents include nitrate compounds such as ammonium nitrate and alkali metal nitrates such as magnesium nitrate, potassium nitrate, sodium nitrate, among others; and phosphate compounds such as ammonium phosphate, and alkali metal phosphates such as potassium phosphate and sodium phosphates, among others.

For the described film forming concentrate, the concentrate solution comprise about 30% by wt water or less, the water component being derived from the ingredient components and not as an added ingredient.

In a preferred embodiment, the film-forming concentrate comprises Ambergum™ 3021 or 1221 as the film-forming agent; organic acids such as gluconic acid, glycolic acid and/or sulfamic acid; inorganic acids such as phosphorous and/or nitric acids; an organic amine or alkali buffering agent; and a glycol solvent such as polyethylene glycol or alkyl glycols.

Surface Tension Reducing Concentrate. In the illustrative example of fountain solution concentrates, a surface tension reducing concentrate can be formulated for combining with an acidic film-forming concentrate, and to comprise all or a major portion of the wetting components of the fountain solution composition, including one or more glycols and/or glycol ether solvents (diluents), partially water-soluble glycol ethers, esters, glycols and/or alcohols (solvents), nonionic surfactants, and optional ingredients such as biocides, dyes, defoaming agents, aromatic sulfonates and/or alkyl sulfates, and dosage or concentration markers (e.g., conductivity marker), among others. An exemplary surface tension reducing concentrate comprises up to about 90% by wt of glycol(s) and/or water-soluble glycol ether(s), preferably about 30-40% by wt of glycol(s) and about 25-35% by wt of water-soluble glycol ether(s); about 1-50% by wt, preferably about 10-30% by wt of nonionic surfactant(s); about 1-25% by wt, preferably about 5-20% by wt of partially water-soluble, glycol ether(s), ester(s), glycol(s) and/or alcohol(s); and optionally about 0-5% by wt, preferably about 1-2% by wt of biocide(s); about 0-5% by wt, preferably about 0-1% by wt of defoaming agent(s); about 0-1% by wt, preferably about 0.0001-0.001% by wt of dye(s); about 0-25% by wt, preferably about 5-10% by wt of conductivity marker(s); and about 0-20% by wt, preferably about 5-10% by wt aromatic sulfonate(s) and/or alkyl sulfate(s).

The glycol and water-soluble glycol ether components function as diluents, and provide added benefits in print quality. The concentrate preferably includes at least one of a glycol or glycol ether in a combined amount of up to about 90% by wt. Suitable glycols include, for example, glycerine, ethylene glycol, polyethylene glycol, diethylene glycol, triethylene glycol, propylene glycol, dipropylene glycol, tripropylene glycol, and hexylene glycol, among others. Examples of suitable water-soluble glycol ethers include ethylene glycol n-butyl ether, ethylene glycol n-propyl ether, ethylene glycol monomethyl ether, diethylene n-butyl ether, propylene glycol monoethyl ether, and tripropylene glycol monomethyl ether, among others.

Surfactants function as wetting agents and increase the solubility of other ingredients in the concentrate and the fountain solution composition. Nonionic surfactants having a hydrophilic-lipophilic balance (HLB) of 1-10 are preferred and include acetylenic glycols, alkyl pyrollidones, propylene oxide/ethylene oxide (PO/EO) block copolymers, alcohol ethoxylates, silanes, aryl ethoxylates, and esters of fatty acids, among others. Useful nonionic surfactants include acetylenic glycol surfactants such as 2,4,7,9-tetramethyl-5-decyne-4,7-diol and its ethoxylates, commercially available from Air Products and Chemicals, Inc. and marketed as Surfynol™ surfactants, Surfynol™ 104 and Surfynol™ 420; alkyl pyrrolidone surfactants such as N-octyl-2-pyrollidone and N-dodecyl pyrollidone, marketed as Surfadone™ surfactants, Surfadone™ LP100 and Surfadone™ LP300, for example, by GAF Corporation; and PO/EO block copolymers such as Pluronic® L series, available commercially from BASF.

The concentrate composition can further include solvents such as partially water-soluble glycols, ethers, esters and/or alcohols. Examples of suitable partially water-soluble glycols include polypropylene glycols, among others. Examples of suitable partially water-soluble glycol ethers and esters include amyl acetate, methyl acetate, ethyl acetate, butyl acetate, propylene glycol phenyl ether, dipropylene glycol n-butyl ether (DPnB), propylene glycol n-butyl ether (PnB), dimethyl esters of adipic, glutaric, and succinic acids (i.e., dimethyl adipate, dimethyl glutarate, dimethyl succinate), among others, and mixtures thereof. Examples of suitable alcohols include isopropyl alcohol, methyl alcohol, ethyl alcohol, n-propyl alcohol, and butyl alcohol, among others.

The concentrate can optionally include an effective amount of a biocide such as sodium benzoate or other compound as described with reference to the acidic film-forming concentrate.

Other optional ingredients include a chemically compatible dye material, and a defoaming agent such as a silicone defoaming agent (emulsified dispersion type or soluble type) or an oil-soluble surfactant.

A conductive salt can be optionally included to provide the solution with an amount of conductivity to function as a dosage or concentration marker. Examples of salts that can be utilized as a conductivity (dosage) marker include nitrates, phosphates, sulfates, and the like. Dyes can also be used as dosage markers, as conventionally known and used in the art.

A sequesterant or chelating compound can also be included to counteract the effects of calcium ions in the water source, which can adversely affect printing and cause scumming to occur. Examples of useful chelating compounds include ethylenediaminetetraacetic acid, diethylenetriaminepentaacetic acid, triethylenetetraminehexaacetic acid, and potassium and sodium salts thereof, among others.

The concentrate can optionally include aromatic sulfonates and alkyl sulfates to increase solubility. Useful aromatic sulfonates include sodium benzene sulfonate, sodium benzene disulfonate, sodium toluene sulfonate, sodium xylene sulfonate, sodium p-ethylbenzene sulfonate, sodium cumene sulfonate, sodium cymene sulfonate, sodium terpene sulfonate, sodium naphthalene sulfonate, ammonium toluene sulfonate, ammonium xylene sulfonate, and ammonium cumene sulfonate, among others. Useful alkyl sulfates include tetrabutylammonium sulfate and ethyl hexyl sulfate, among others.

For the described surface tension reducing concentrate, the concentrate solution will contain about 10% by wt water or less, the water component being derived from the ingredient components and not as an added ingredient.

In a preferred embodiment, the surface tension reducing concentrate comprises ethylene glycol n-butyl ether (e.g., butyl Cellosolve™), polyethylene glycol, a non-ionic surfactant such as acetylenic glycol surfactants and alkyl pyrrolidone surfactants, and a partially water soluble glycol ether and/or ester.

The concentrate compositions comprise the chemical constituents in a super concentrated form. The concentrates comprise water from the raw materials that are utilized. Preferably, the concentrates comprise substantially no added water component.

In producing a press-ready fountain solution composition according to the invention, the liquid super concentrates containing the chemical ingredients of the fountain solution can be blended together in pre-selected proportions and combined with water. The resulting fountain solution product has a desired concentration of components. The water component preferably comprises deionized or distilled water, or water sufficiently free of electrolytes. In the illustrated example, a typical fountain solution comprises about 1-30% by wt of the exemplified film-forming concentrate, about 1-30% by wt of the surface tension reducing (wetting) concentrate, and about 50-90% by wt water.

The amount of the acidic film-forming polymer concentrate included in a fountain solution is generally based on the type of plate that is being used. In an application involving an aluminum plate, for example, the fountain solution would typically comprise about 0.5-0.9 oz. of the acidic film-forming polymer concentrate per gallon of water, or about 0.4-0.7% by vol. The amount of the wetting concentrate is generally based on the type of press being used. For example, for a fast-speed press (e.g., M-3000 press), a fountain solution having a surface tension of about 32 dynes/cm is preferred. To that end, the fountain solution would typically comprise about 0.7-0.9 oz. of the surface tension reducer (wetting) concentrate per gallon of water, or about 0.5-0.7% by vol.

Monitoring. For a typical fountain solution composition, the conductivity is maintained at about 1000 to about 4000 micromhos, the pH (hydrogen ion activity) at about 2-6, and the surface tension at about 30-50 dynes/cm, as measured dynamically.

To maintain the desired range of these parameters in the fountain solution, the pH, conductivity, and/or surface tension can be monitored, and the amounts of the concentrate compositions that are introduced into the mixing apparatus can be adjusted accordingly. Probes and monitoring devices to measure these parameters are well known in the art and commercially available. Such devices can be placed in contact with the fountain solution composition in the vicinity of the exit conduit of the mixing apparatus and/or in the recirculating tank, for example, and electrically connected to the adjustment mechanisms of the mixing apparatus (e.g., pump) to control the metering of the concentrate components into the mixer. A controller can be used to operate the intake valves or other mechanism of the mixer in response to the electrical signals from the probes to alter the amounts of the concentrates delivered to the mixing chamber of the mixer.

The following example is illustrative of the method and system of the invention.

EXAMPLE

The process of the invention was followed in a series of experiments in which an acidic film-forming base concentrate (A) and surface tension reducer (wetting) concentrate (B) were formulated and separately metered into a water flow using a dual pump proportioner, as described with respect to FIG. 3, to form a final fountain solution.

The acidic film-former base concentrate (A) and surface tension reducer concentrate (B) were formulated as follows:

| Concentrate A Acidic Film-forming Base | | Concentrate B Surface Tension Reducer | |
|---|---|---|---|
| Ingredients | % by wt | Ingredients | % by wt |
| Glycolic acid | 13 | Polyethylene glycol | 31 |
| Gluconic acid | 10 | Butyl Cellosolve ™ (glycol ether) | 40 |
| Sulfamic acid | 3 | Surfynol 440 surfactant | 7 |
| Ambergum ™ 3021 cellulose gum | 33 | Surfynol 420 surfactant | 6 |
| Monoethanolamine | 14 | Magnesium Nitrate | 14 |
| Nitric Acid | 11 | Biocide | 2 |
| Phosphoric acid | 3 | Dye | 0.0001 |
| Polyethylene glycol | 13 | Total | 100 |
| Dye | 0.0001 | | |
| Total | 100 | | |

Delivery of the two concentrates A and B by the dual proportioning pump was set on a scale of 0 to 10 and based on the mix between concentrates A and B to achieve a projected pH 3.8 to 4.2 and conductivity of 1800-2600 microohms. For delivery of the acidic film-forming base concentrate (A), the pump was set for delivery of 0 oz./gal at the "0" pump setting, and 3 oz./gal at the "10" setting. For delivery of the surface tension reducer concentrate (B), the pump was set for delivery of 0 oz./gal at the "0" pump setting, and 1.5 oz./gal at the "10" setting.

An initial run of the system was conducted to check flow feed rate and to assure metering consistency and the accuracy of metering ratios over a 4-hour period. The operating conditions of the initial run were as follows:

Pump setting start levels (scale of 1 to 10 units):
- Solution A: setting at 4.5=0.7 oz/gal
- Solution B: setting at 5=0.75 oz/gal pH of final fountain solution: pH 3.9

Conductivity of fountain solution: 2600 microohms

Dynamic surface tension of fountain solution: 40.7 dynes/cm

After the initial run, an extended test was conducted to determine the accuracy and longevity of the pump and chemistry system over a 17-day time period. The operating conditions of the test run were as follows:

Pump setting start levels (scale of 1 to 10 units):
- Solution A: setting at 5.5=0.8 oz/gal
- Solution B: setting at 5=0.75 oz/gal

TABLE 1

| Sample (Day) | pH | Conductivity (microohms) | Dynamic Surface tension (dynes/cm) | Setting adjustments |
|---|---|---|---|---|
| 1 | 4.08 | 2700 | 39.2 | |
| 2 | 4.2 | 2400 | 36.7 | Slight adjustment to A to 4.9 |
| 3 | 4.3 | 2200 | 38.5 | |
| 5 | 4.2 | 2500 | 41.5 | |
| 6 | 4.01 | 2800 | 40 | |
| 9 | 4.03 | 2500 | 38.8 | |
| 10 | 4.03 | 2500 | 38.8 | Slight adjustment to B to 4.5 |
| 13 | 4.1 | 2400 | 42.8 | Slight adjustment to B to 5 |
| 14 | 4.01 | 2500 | 38.2 | |
| 16 | 4.04 | 2500 | 37.6 | |
| 17 | 4.00 | 2800 | 37.5 | |

The anticipated and actual (average) results of the parameters of the fountain solution were as follows:

TABLE 2

| Results | pH | Conductivity (micromhos) | Dynamic Surface tension (dynes/cm) |
|---|---|---|---|
| Expected | 3.8 to 4.2 | 2500-2900 | 38.5 to 40.5 |
| Actual (average) | 4.09 | 2527.27 | 39.0 |

The results demonstrated that multiple concentrates (e.g., a film-forming concentrate and a wetting concentrate) comprising the ingredients of a fountain solution product can be separately formulated and then combined to produce a fountain solution having substantially the same properties of pH, conductivity and surface tension as a similar conventional fountain solution produced by formulating a single fluid concentrate that is mixed with water.

The results also demonstrated that the dual-action proportioning pump could consistently deliver at relatively low dosages substantially the same amount of chemical ingredients over an extended period of time to produce a fountain solution that provides the same or better print quality as a conventional fountain solution produced by diluting a formulated single fluid concentrate with water.

Advantageously, the preparation and blending of at least two separate concentrates with water to produce a press-ready fountain solution according to the invention allows a user to utilize different types of paper and plate types during a press run. For example, in switching to a paper stock requiring a comparatively higher level of wetting, the present invention allows the operator to easily increase the wetting components of a fountain solution without increasing the gum components. A press operator can also readily vary the level of desensitizing components in a fountain solution to accommodate a change in plate-type without also varying the wetting components of the fountain solution. The invention allows increased latitude for an operator to alter a fountain solution formulation to accommodate variations in paper stock and plate type during a press operation.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed:

1. A liquid film-forming precursor concentrate for a fountain solution, comprising:

about 10-60% by wt of one or more water-soluble film-forming polymers, about 5-50% by wt of one or more organic acids, about 5-50% by wt of one or more inorganic acid or salt thereof, buffering agent, water at less than 30% by wt, and excluding a surfactant component.

2. The precursor concentrate of claim 1, wherein the water-soluble film-forming polymer is selected from the group consisting of gums, starch derivatives, complex sugars, alginates, cellulose derivatives, and combinations thereof.

3. The precursor concentrate of claim 1, further comprising a water-soluble glycol solvent, biocide, desensitizing agent, chelating agent, dye, or combinations thereof.

4. The precursor concentrate of claim 3, wherein the water-soluble glycol solvent is selected from the group consisting of glycerine, $C_2$ to $C_6$ glycols, polyglycols, and combinations thereof.

5. The precursor concentrate of claim 1, comprising about 5-30% by wt buffering agent.

6. The precursor concentrate of claim 1, further comprising about 1-50% by wt of water-soluble glycol solvent, about 1-5% by wt biocide, about 5-30% by wt desensitizing agent, about 0.1-10% by wt chelating agent, about 0-1% by wt dye, or a combination thereof.

7. A liquid film-forming precursor concentrate for a fountain solution, comprising:

one or more water-soluble film-forming polymers, one or more organic acids at about 20-50% by wt, and water at less than 30% by wt, the water being derived from ingredient components, and excluding a surfactant component.

8. A liquid film-forming precursor concentrate for a fountain solution, comprising: about 20-40% by wt film-forming polymer, about 20-30% by wt organic acid, about 10-20% by wt inorganic acid, and about 10-20% by wt buffering agent, water at less than 30% by wt, and a pH of about 3.5-5.5, and excluding a surfactant component.

9. A liquid film-forming precursor concentrate for a fountain solution, comprising:

about 20-40% by wt film-forming polymer;

about 20-30% by wt organic acid;

about 10-20% by wt inorganic acid or salt thereof;

about 10-20% by wt buffering agent;

about 10-20% by wt water-soluble glycol solvent; and water at less than 30% by wt;

the concentrate having a pH of about 3.5-5.5, and the concentrate excluding a surfactant component.

10. The precursor concentrate of claim 9, wherein the film-forming polymer is selected from the group consisting of gums, starch derivatives, complex sugars, alginates, and cellulose derivatives.

11. The precursor concentrate of claim 9, wherein the film-forming polymer is selected from the group consisting of gum arabic, dextrin, enzyme-decomposed dextrin, hydroxypropylated enzyme-decomposed dextrin, carboxymethylated starch, phosphoric acid starch, octenyl succinated starch, polysaccharides, polyvinyl alcohol, vinyl co-polymers, alginate, carboxymethyl cellulose, carboxyethyl cellulose, methyl cellulose, hydroxyethylcellulose, hydroxypropylcellulose, hydroxybutylmethylcellulose.

12. The precursor concentrate of claim 9, wherein the film-forming polymer comprises sodium carboxymethyl cellulose.

13. The precursor concentrate of claim 9, wherein the organic acid is selected from the group consisting of citric acid, gluconic acid, glycolic acid, sulfamic acid, tartaric acid, ascorbic acid, malic acid, maleic acid, lactic acid, acetic acid, malonic acid, levulinic acid, sulfanilic acid, p-toluenesulfonic acid, phytic acid, and organic phosphonic acid.

14. The precursor concentrate of claim 9, wherein the inorganic acid or salt thereof is selected from the group consisting of nitric acid, phosphoric acid, sulfuric acid, and salts thereof.

15. The precursor concentrate of claim 9, wherein the inorganic acid or salt thereof is selected from the group consisting of nitrates, phosphates, and phosphonates.

16. The precursor concentrate of claim 9, wherein the buffering agent is selected from the group consisting of ammonium hydroxide, alkali metals, and organic amines.

17. The precursor concentrate of claim 9, wherein the buffering agent is selected from the group consisting of sodium hydroxide, sodium carbonate, potassium hydroxide, and potassium carbonate.

18. The precursor concentrate of claim 9, wherein the buffering agent is selected from the group consisting of monoethanolamine, ethylenediamine, and triethanolamine.

19. The precursor concentrate of claim 9, wherein the water-soluble glycol solvent is selected from the group consisting of ethylene glycol, polyethylene glycol, diethylene glycol, triethylene glycol, propylene glycol, dipropylene glycol, tripropylene glycol, and hexylene glycol.

20. A liquid film-forming precursor concentrate for a fountain solution, comprising: about 10-60% by wt water-soluble film-forming polymer, about 5-50% by wt organic acid, about 5-50% by wt inorganic acid or salt thereof, water at less than 30% by wt, and the concentrate excluding a surfactant component.

21. A liquid film-forming precursor concentrate for a fountain solution, comprising: about 20-40% by wt film-forming polymer, about 20-30% by wt organic acid, about 10-20% by wt inorganic acid, and water at less than 30% by wt, with a pH of about 3.5-5.5, and the concentrate excluding a surfactant component.

22. A liquid film-forming precursor concentrate for a fountain solution, comprising:

about 10-40% by wt water-soluble film-forming polymer;

about 10-30% by wt organic acid;

about 5-20% by wt inorganic acid or salt thereof water at less than 30% by wt; and excluding a surfactant component.

23. The precursor concentrate of claim 22, further comprising about 5-20% by wt buffering agent.

24. The precursor concentrate of claim 22, further comprising about 5-20% by wt water-soluble glycol solvent.

* * * * *